United States Patent
Daniel et al.

(10) Patent No.: US 7,359,109 B2
(45) Date of Patent: Apr. 15, 2008

(54) REAR-VIEWABLE REFLECTIVE DISPLAY

(75) Inventors: Jurgen H. Daniel, Mountain View, CA (US); Robert A. Street, Palo Alto, CA (US); Brent S. Krusor, Fremont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 11/012,599

(22) Filed: Dec. 14, 2004

(65) Prior Publication Data

US 2006/0125777 A1 Jun. 15, 2006

(51) Int. Cl.
*G02B 26/00* (2006.01)
*G09G 3/34* (2006.01)

(52) U.S. Cl. ........................ 359/296; 345/107; 359/900
(58) Field of Classification Search ................ 359/296, 359/253, 254, 267, 269, 272, 900; 345/105, 345/107, 108, 111, 84; 430/35; 252/572; 204/488
See application file for complete search history.

(56) References Cited

U.S. PATENT DOCUMENTS

| | | | |
|---|---|---|---|
| 5,798,032 A * | 8/1998 | Khan et al. | 204/452 |
| 6,017,584 A | 1/2000 | Albert et al. | |
| 6,597,340 B1 * | 7/2003 | Kawai | 345/107 |
| 6,936,190 B2 * | 8/2005 | Yoshida | 252/511 |
| 6,947,202 B2 * | 9/2005 | Liang et al. | 359/296 |
| 6,987,603 B2 * | 1/2006 | Paolini et al. | 359/296 |
| 2002/0094755 A1 * | 7/2002 | Amineh | 446/491 |
| 2006/0089425 A1 * | 4/2006 | Chopra et al. | 523/206 |

OTHER PUBLICATIONS

Stephenson, Stanle, Johnson, David, Kilburn, John, Mi, Xiang-Dong, Rankin, Charles, Capurso, Robert: Development of a Flexible Electronic Display Using Photographic Technology, SID 04 Digest, pp. 774-777.
Wager, John F., Transparent Electronics, Science Magazine, May 23, 2003, pp. 1245-1246, vol. 300. www.sciencemag.org.

* cited by examiner

*Primary Examiner*—Ricky Mack
*Assistant Examiner*—Jack Dinh
(74) *Attorney, Agent, or Firm*—Kent Chen (57) ABSTRACT

A novel reflective display system is described. The display system is viewable through the display backplane instead of the counterelectrode. Making the display viewable through the backplane allows use of a conducting elastomer as a counterelectrode which facilitates fabrication of a flexible display. The rear-viewable display also facilitates attachment of color filters directly to the backplane simplifying filter pixel alignment issues.

20 Claims, 6 Drawing Sheets

REAR-VIEWABLE REFLECTIVE DISPLAY

BACKGROUND

Modern reflective displays, such as typical electrophoretic displays, are fabricated in a sandwich structure that includes an electronic backplane, a display media and a counter electrode. The electronic backplane and the counter electrode together generate an electric field that controls the reflectivity of the sandwiched display media. Individually controlling the electric field applied to pixels enables image formation. Observers view the image through the counter electrode A flexible reflective display is highly desirable because of its paper-like qualities. Owing to the presence of the display media, both the backplane and the counter electrode are subject to significant mechanical stress when such a display is bent. A first problem with such sandwich structures is that it is difficult to make transparent highly flexible counter electrodes. Current transparent flexible counter electrodes are fabricated by depositing indium tin oxide on Mylar to form a counter electrode. However such counter electrodes suffer from lack of high flexibility or stretch-ability. Ideally, an elastomeric transparent conducting counter electrode is highly desirable.

However, transparent conductive elastomeric materials are not currently available. Elastomeric conductive materials can be made by adding conductive materials such as graphite, gold particles, nickel plated particles and the like to an elastomer. However, the resulting material is not transparent and thus inappropriate for a counter electrode.

In color displays, each pixel output is typically a function of the pixel state of display material and a color filter corresponding to each pixel. The color filter determines the color of the light reflected. Each color filter is typically patterned directly on the counter electrode. However patterning color filters on a flexible counterelectrode presents alignment problems both during and after manufacture.

Attaching the color filters to the counter electrode means that during assembly, the counter electrode must be precisely aligned with the electronics in the backplane. During operation, the filters should remain aligned with the control electronics in the backplane so that each pixel outputs the desired colored light. This alignment maintenance can be difficult when the display flexes.

Thus, an improved display system is needed.

SUMMARY

A display system is described. The display system includes an electronic backplane that includes large regions that are substantially transparent. A display media including a display material that changes reflective states in response to an electric field is positioned between the electronic backplane and an elastomeric counter electrode layer made of a conductive material. The display system thus forms a reflective display viewable from the backplane side of the display.

In one embodiment of the invention, a flexible display includes a flexible opaque elastomer for a counter electrode. Color display systems may include color filters patterned directly onto the backplane. Forming color filters directly on the backplane simplifies alignment issues.

DETAILED DESCRIPTION

A flexible, easy to fabricate reflective display system is described. In one embodiment, the counter electrode of the display system is fabricated from an elastomer. The elastomer may be transparent or opaque. Color filters may be deposited over the backplane to produce a color display.

Figure 1:
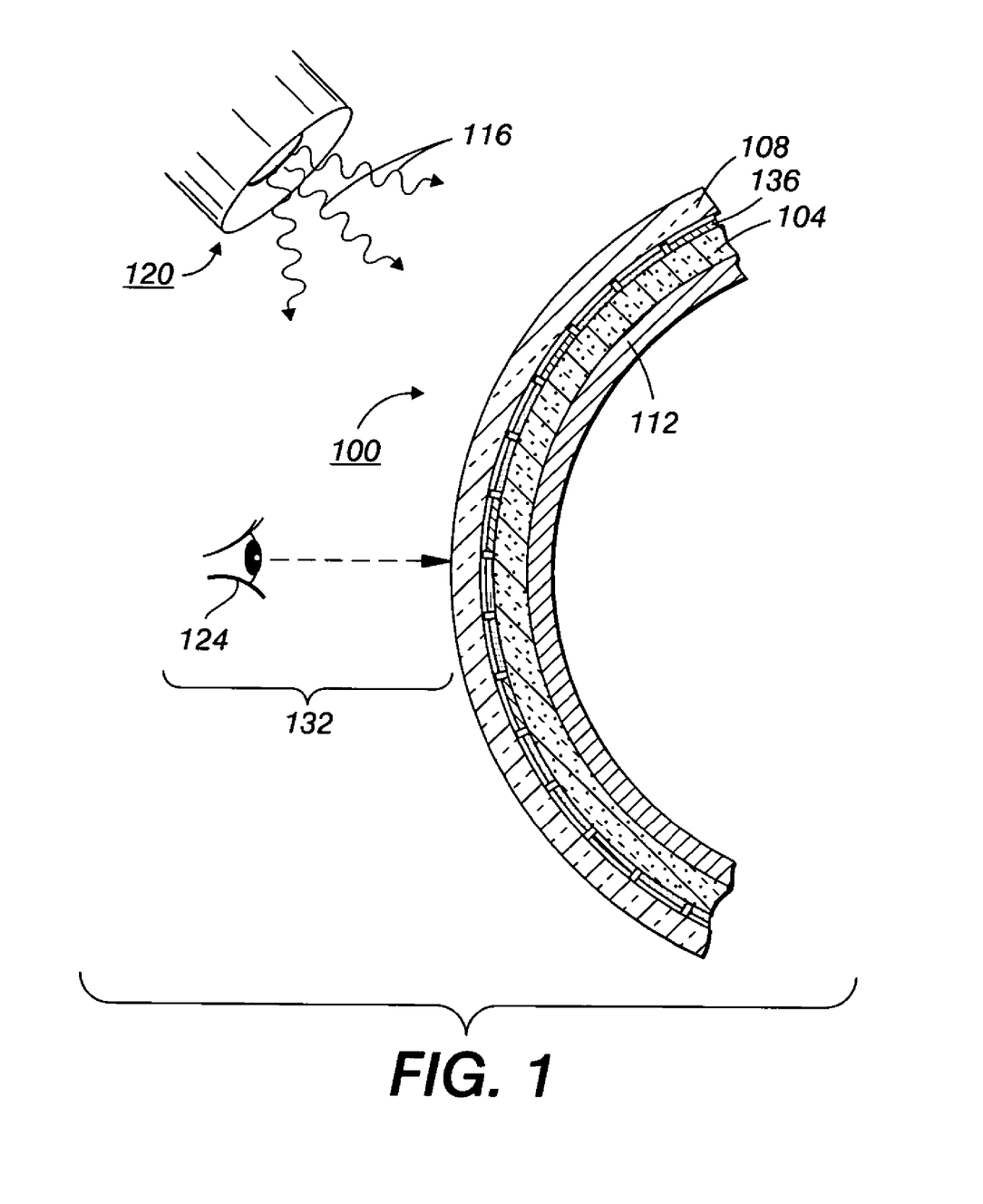
FIG. 1 shows a cross sectional schematic side view of a non-laterally addressed reflective display including a transparent backplane and a flexible counter electrode.

FIG. 1 shows a cross sectional schematic view of a non-laterally addressed, reflective display 100. As used herein, "reflective display" is defined as a display in which a light source that produces an image and an observer that view the image are located on the same side of the display. As used herein, "laterally addressed" is defined as an addressing scheme in which the electrodes that control the display media are entirely on one substrate and a counter electrode is not needed.

Display 100 includes a backplane 108 and a counter electrode 112 that sandwiches a display media 104. Light 116 from a light source 120 enters display 100 through backplane 108. Pixels in display media 104 control the reflection, and transmission of light 116 photons. Light reflected from display media 104 exits backplane 108 and reaches an observer 124 positioned on side 132 of the display 100 that includes light source 120.

Display media 104 or "ink" includes a material that changes reflective properties according to an electric field applied by the backplane 108 and counter electrode 112. An encapsulated electrophoretic ink serves as one example of a typical display material. Another example is an electro-osmosis ink as described in U.S. Pat. No. 6,017,584 entitled "Multi-color electrophoretic displays and materials for making the same" issued on Jan. 26, 2000. Still another example of a material that changes reflective states upon application of an electric field is a liquid crystal nematic fluid. Microfabricated arrays of sealed chambers may encapsulate the ink. For example, an elastomeric binder, such as silicone binds the microencapsulated ink. The bound microencapsulated ink may be laminated directly to backplane 108. Alternately, micro chambers may be patterned, printed, molded, or otherwise formed directly on backplane 108. The micro chambers are filled with electrophoretic ink and then sealed. In an alternate embodiment, media based on microchambers are separately made and then affixed, laminated or bonded to the backplane.

Counter electrode 112 cooperates with backplane 108 to control the reflective state of the display material 104 sandwiched between the backplane and the counter electrode. A voltage applied between the pixels of the backplane and the counterplate produces an electric field which affects the display medium. The electric field direction and strength at a pixel determines the 'colour' state of the display medium at that pixel.

In a rear viewable display, an opaque counter electrode layer 112 may be used. Typically, the counter electrode is not substantially visible in an electrophoretic display because the electrophoretic ink reflects or absorbs light. In a two-particle electrophoretic display the pixel 'colour state' is determined by the colour of the electrophoretic particles observed through backplane 108. The electric field direction at a pixel, together with the charge polarity of the particles determines the black or white state (in a display in which black and white particles with opposite charge polarity are used).

In a flexible display, a conducting elastomer may form opaque counter electrode 112. As used herein, "elastomer" is defined as any material with a low coefficient of elasticity (Young's modulus) that will return to its original dimensions after being stretched or distorted. In particular, when an elastomer structure is bent, the curvature k is approximately equal to M/E*I where, M=the bending moment applied to the structure, E=the Young's modulus and I=to the moment of inertia. In a typical elastomer, the Young's modulus is between 0.01 to 0.1 Giga-Pascals (GPa) resulting in a structure that is not exceedingly stiff (the Young's modulus times the moment of inertia being an approximate measure of stiffness). Examples of elastomers include polymeric materials such as silicone, latex rubbers, polychloroprene, polyurethane, polybutadiene, and polyisobutylene. One particularly favorable material is an amorphous, cross linked high polymer that stretches rapidly under tension reaching high elongations of up to 500% to 1000% with low damping. Upon release, the elastomer recovers to its original dimensions. Conductive particles such as graphite, gold or nickel plated particles added to the elastomer can turn the elastomer conductive.

Various commercially available materials may be used to form the counter electrode. For example, intrinsically conductive polymers such as Baytron (PEDOT based) or polymer sheets with conductive fillers (such as conductive silicone and conductive Teflon by DuPont) may serve as a counter electrode. Commercially available Mylar sheets also can form acceptable counterelectrodes, however, Mylar is not an elastomer. In an alternate embodiment, a graphite powder is combined with silicone, such as clear silicone from Quick Grab of Haverhill, Mass. The graphite and silicone combination produces a black conductive slurry. Doctorblading or otherwise depositing the slurry onto an electrophoretic media and subsequently curing the slurry results in a black conductive layer of flexible silicone. The black conductive flexible silicone layer forms a suitable display counter electrode. The low Young's modulus (high elasticity) of the counter electrode, when deposited over a flexible backplane, results in a highly flexible display system.

Backplane 108 includes the electronics used to address display media 104 pixels. Backplanes used in the rear-viewable displays may utilize a structure similar to Liquid crystal display (LCD) backplanes. When an active matrix backplane is used, counter electrode 112 may simply be a continuous conducting layer.

Figure 2:
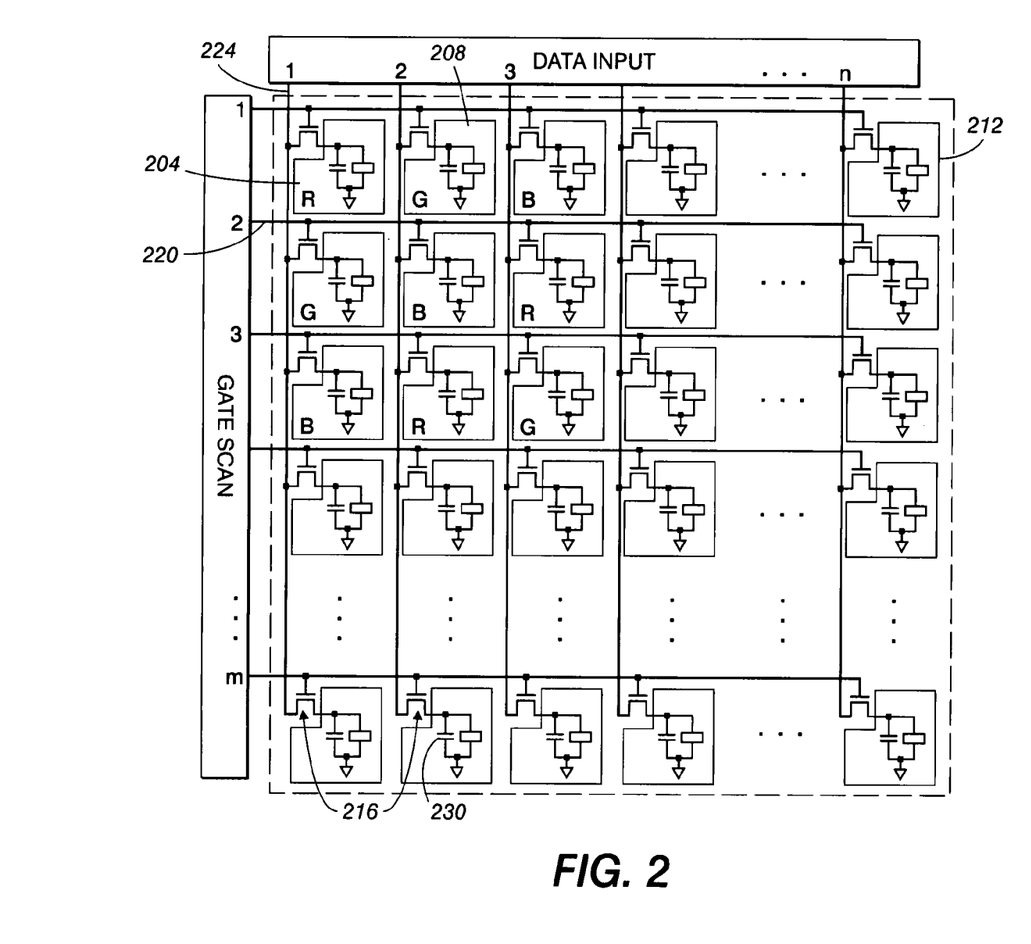
FIG. 2 shows a top view of an active matrix backplane

FIG. 2 shows an example backplane in an active matrix structure display. In an active matrix structure, the backplane includes pixels 204, 208, 212. Typically, the pixels include a transistor such as a thin film transistor (TFT) 216 which is addressed by a corresponding gate line 220 and data line 224. The TFT is also called a 'pixel switch' (another example of a pixel switch would be a metal-insulator-metal device as described in 'Liquid crystal displays', by Ernst Lueder, Wiley 2001). A storage capacitor 230 helps to maintain the pixel state when the gate and data line are addressing other pixels. Backplanes can be made by several techniques, including conventional photolithography as well as novel processes such as jet-printing, and stamping. The TFT may be made from amorphous silicon, poly-silicon, organic semiconductors or other suitable materials.

Figure 3:
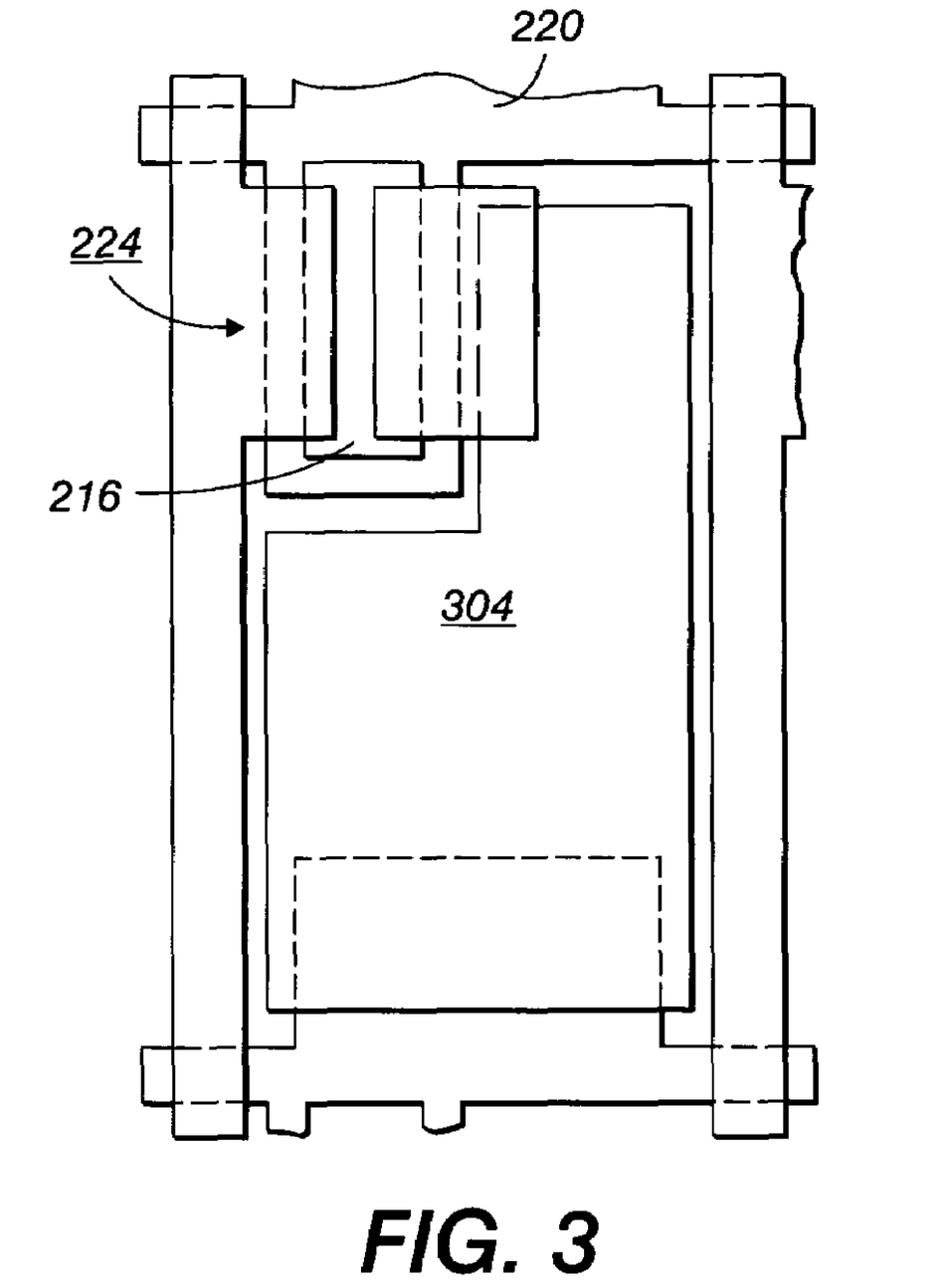
FIG. 3 shows an expanded view of one pixel in the active matrix backplane of FIG. 2.

FIG. 3 shows an expanded view of an example layout of a pixel in backplane 108. In FIG. 3, the gate line and data line 224 couples to TFT transistor 216. Transistor 216 controls the voltage potential on pixel pad or pixel electrode 304. The pixel potential together with the voltage potential on the counterplate control the display media 104 ink.

In the case of an opaque counter electrode, incident light passes through active matrix backplane, 108 and reaches the display material. Select pixels in the display material reflect incident light back through backplane 108 to observer 124. Other pixels are electronically addressed and set to absorb the incident light. The structure allows display viewing of a formed image through the backplane.

Various methods of forming a highly transmissive backplane are available. In one method, a high "aperture ratio" backplane is formed including transparent regions and non-transparent regions. As used herein, "aperture ratio" is the ratio of transparent backplane areas to non-transparent backplane areas. The higher the aperture ratio, the better the display appearance. Typically, a minimum aperture ratio of 50% is desirable, while an aperture ratio of above 70% is preferred.

In order to facilitate light transmission through the backplane, pixel electrodes may be made from transparent indium tin oxide (ITO) deposited over a transparent substrate. Examples of transparent flexible substrates include clear plastics, ultra-thin glass, Mylar by DuPont, Arylite, Appear, and Sumlite from Promerus of Brecksville Ohio. Plastic substrates may be pre-coated to give a smooth surface and to create a moisture barrier. Data and gate lines in these LCDs are typically made of nontransparent metal. These metals can create specular reflections that interfere with viewing images through the backplane.

In order to maximize backplane light transmission and minimize specular reflections, backplane lines such as gate line 220 and data line 224 can be made from a transparent material such as vacuum deposited ITO, ITO dispersions, nano metal dispersions and/or carbon nano tube-based conducting coatings. ZnO/Al2O3 systems provide an inexpensive alternative to ITO transparent oxides. Non-stoichiometric and doped films of oxide based on materials such as tin, cadmium, gallium, copper and zinc and their blends also offer high conductivity and light transmittance. Materials that exhibit transmittance and moderate conductivity when applied in thin layers and thus may also be used to fabricate conducting lines include organic conducting materials such as the ones of the Baytron (Bayer AG) group of materials (e.g. Baytron CPUD2, Baytron PVPCH8000, Baytron P, Baytron PVPAL4083) and transparent oxides that become permanent conductors after exposure to ultraviolet light such as developed by the Japan Science and Technology corporation.

In very high aperture ratio backplanes, not only the address lines, but also the transistors may be transparent. Transparent transistors made from ZnO offer one method of fabricating such a structure. Such transparent transistors are described in an article by J. F. Wagner entitled "Transparent Electronics", *Science*, Vol. 300, 23 May 2003, pp.1245-1246 which is hereby incorporated by reference.

In inexpensive, low aperture ratio displays, transparent lines and transistors are unnecessary. However, when opaque lines are used, minimizing specular reflections improves display performance. Patterning gate and data lines, capacitor electrodes and transistors in a dark color, such as a black, minimizes the specular reflections. Keeping opaque regions small or narrow compared to the overall pixel area also improves the aperture ratio.

Various methods have been developed to deposit the opaque address lines. In one method developed by Thin Film Devices, Inc of Anaheim Calif. black chrome deposited by ion beam sputtering forms a dark conducting coating. Highly conductive metals such as copper may be deposited over the dark coatings. To minimize the width of gate and data lines and maximize line conductivity, highly conductive metals may be built up so that the line height is substantial compared to line width.

Figure 4:
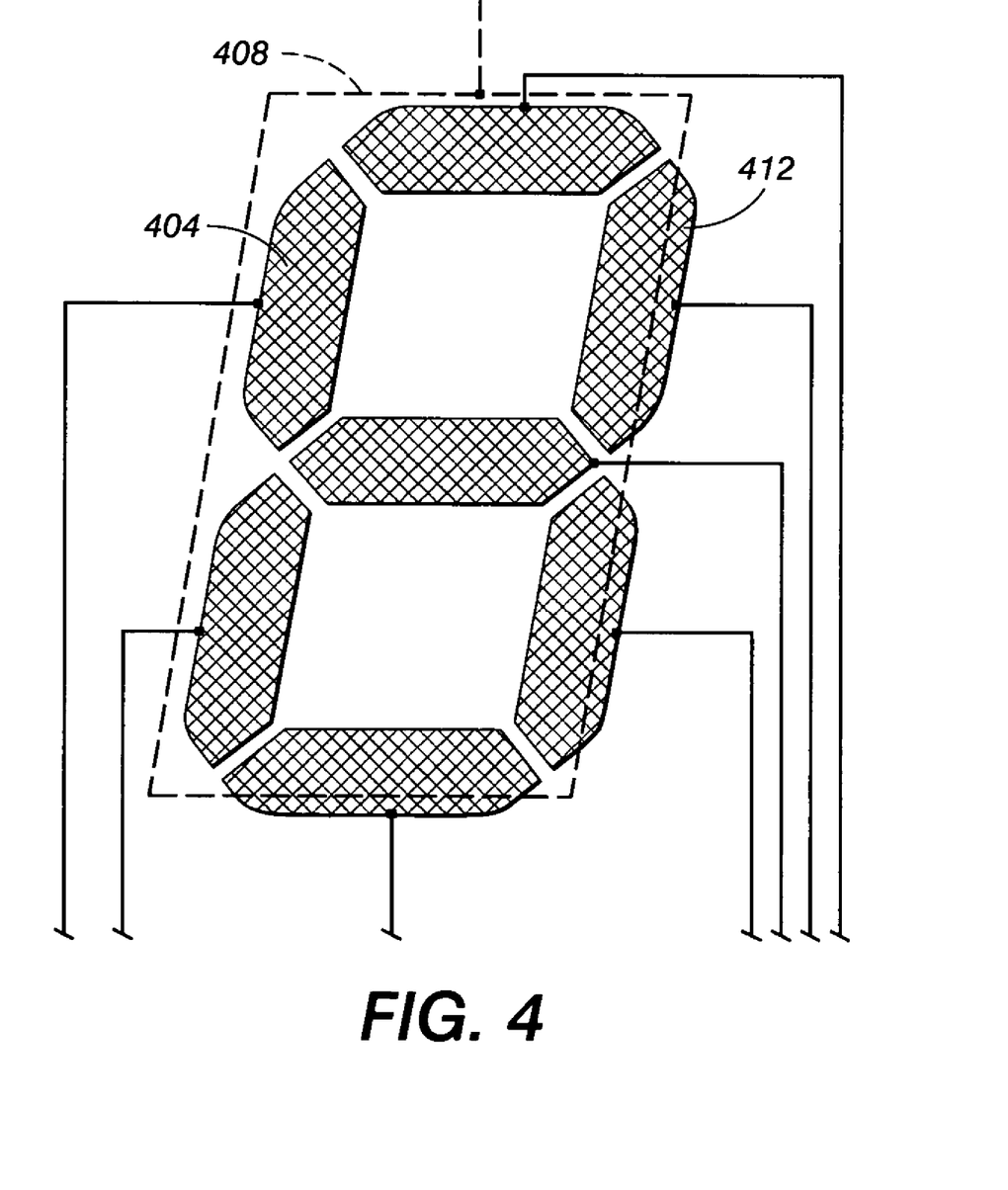
FIG. 4 shows a schematic view of a segmented direct addressing display system.

The described rear viewable display should not be limited to active matrix systems. Conducting elastomers may form one side of other display systems. FIG. 4 shows one example of a segmented direct addressing system. In the segmented direct addressing system of FIG. 4, each segment is individually addressed by a segmented electrode 404, 412. The segmented electrodes and the circuitry addressing the segmented electrode forms the backplane. The backplane and a common counter electrode 408 sandwich a display material, such as an electrophoretic ink. In one embodiment, the counter electrode 408 is formed from an opaque conducting elastomer, although conducting transparent and partially transparent elastomers may also be used. Together, the counter electrode and the backplane containing the segmented electrodes apply the electric fields to control the output of the display material.

Figure 5:
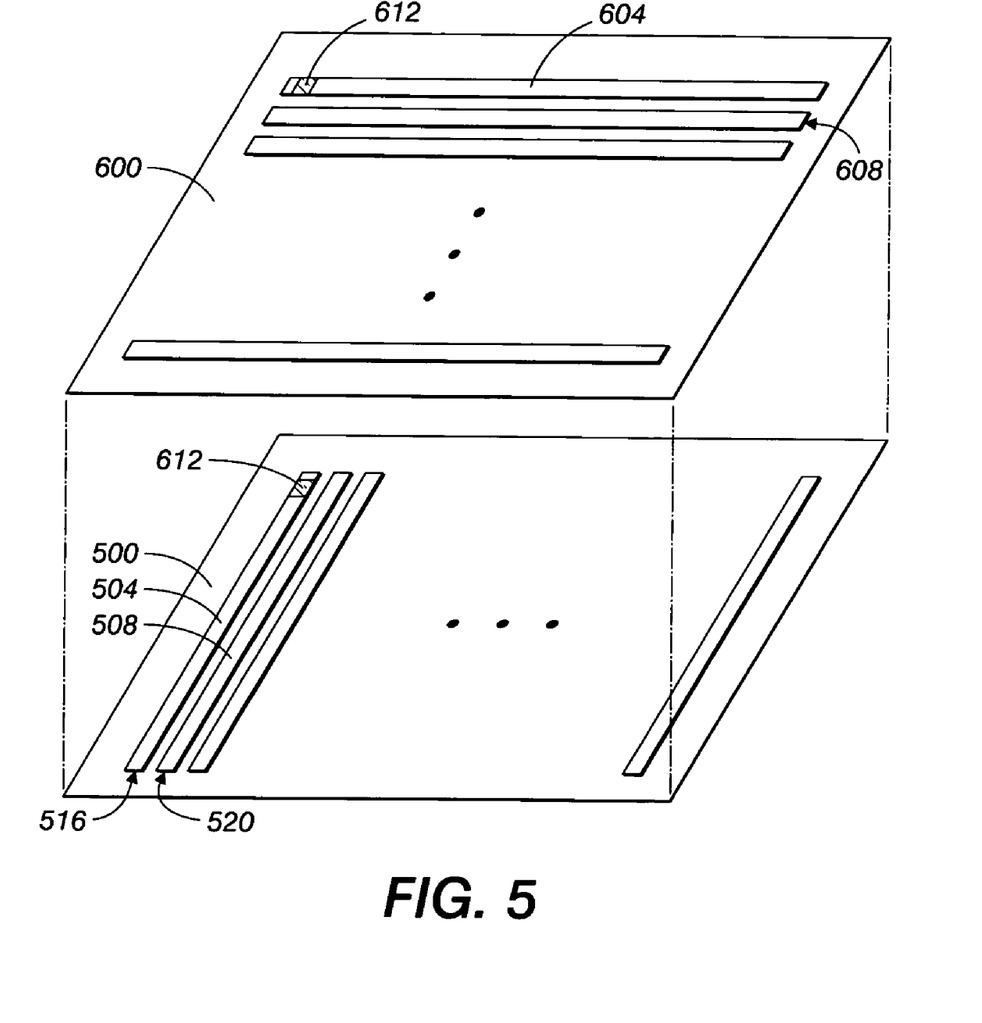
FIG. 5 shows an example passive matrix structure.

Passive matrix display backplanes offer an alternative to active matrix displays. FIG. 5 shows a passive matrix backplane 500 using an array of stripe electrodes 504, 508 to address the pixels in the display. Each pixel is defined by a crossover area between the stripes of the front and the backplane). Address lines 516, 520 control the backplane stripe electrodes.

A typical passive matrix transparent backplane may be formed by patterning a transparent conductor, such as indium tin oxide (hereinafter ITO) on a transparent substrate such as glass. Because the display is flexible, the glass layer is very thin, e.g. the one made by Schott or Mylar™ or other polymer films such as polyester (PET) and polyethylene naphthalate (PEN) films of DuPont's Teijin product range. Additional examples of suitable flexible substrates include Appear™, AryLite™ and Sumilite® materials which are distributed by Promerus™, Ferrania Imaging Technologies and Sumitomo Bakelite Co., Ltd. Alternatively, many of the previously described transmissive conducting materials, including but not limited to ITO dispersions, nano metal dispersions, carbon nano tube-based conducting coatings, non-stoichiometric and doped films of oxide materials and organic conducting materials may be used to fabricate the transparent electrodes on the transparent backplane.

The passive matrix display includes a counter electrode formed over the backplane. Passive matrix displays typically do not distinguish between a "backplane" and a "counter electrode" because both planes of the passive matrix display simply consist of conducting strips. However, in the current application, one of the planes is typically fabricated from an elastomeric material. Thus for purposes of this discussion, the surface that is made from elastomeric material shall be called the "counter electrode" of a passive matrix display. FIG. 5 shows an example passive matrix counter electrode 600 including conducting stripe electrodes 604, 608 perpendicularly oriented to the backplane stripe electrodes. Addressable pixels, such as pixel 612, are located where backplane stripe electrodes 504 and counter electrode stripe electrodes 604 intersect. A variety of techniques to form the conducting strips on an elastomeric dielectric substrate may be used. The conducting stripes are typically fabricated as part of an elastomeric layer. For example, narrow stripes of conducting and non-conducting silicone formed using an extrusion technique may be used.

Color displays often use color filters to control pixel color output. Traditionally, in front-view displays, color filters are fabricated on the counter electrode. Forming the color filters on the counter electrode makes counter electrode and backplane alignment critical. The spacing between color filters and backplane may also produce misalignment and improper display output when the display is bent.

Forming color filters, such as color filters 136 of FIG. 1, directly on an active matrix backplane 108 that includes the pixel circuitry minimizes alignment problems. The color filters may be patterned directly onto the backplane using a variety of techniques, including but not limited to photolithography and various printing techniques. Color filters on the backplane are possible because this display is viewed from the rear through the backplane. The color filters may be additive red green blue (RGB) filters or they may be 4-colour (RGBW) filters (a white-pixel without filter-pixel is added) or filter arrangements with even more colours). The filters may also only partially cover the display. For example in areas of the display that are intended to display text the filters may be left away to achieve improved black/white contrast.

Figure 6:
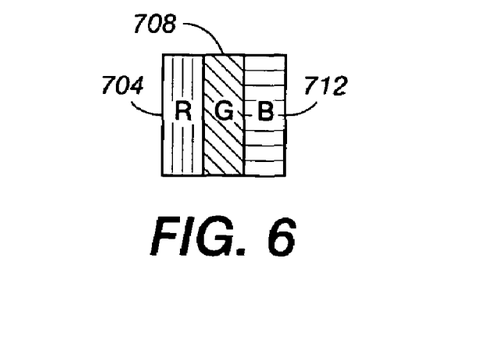
FIG. 6 is an example top view of color filter pattern.
Figure 7:
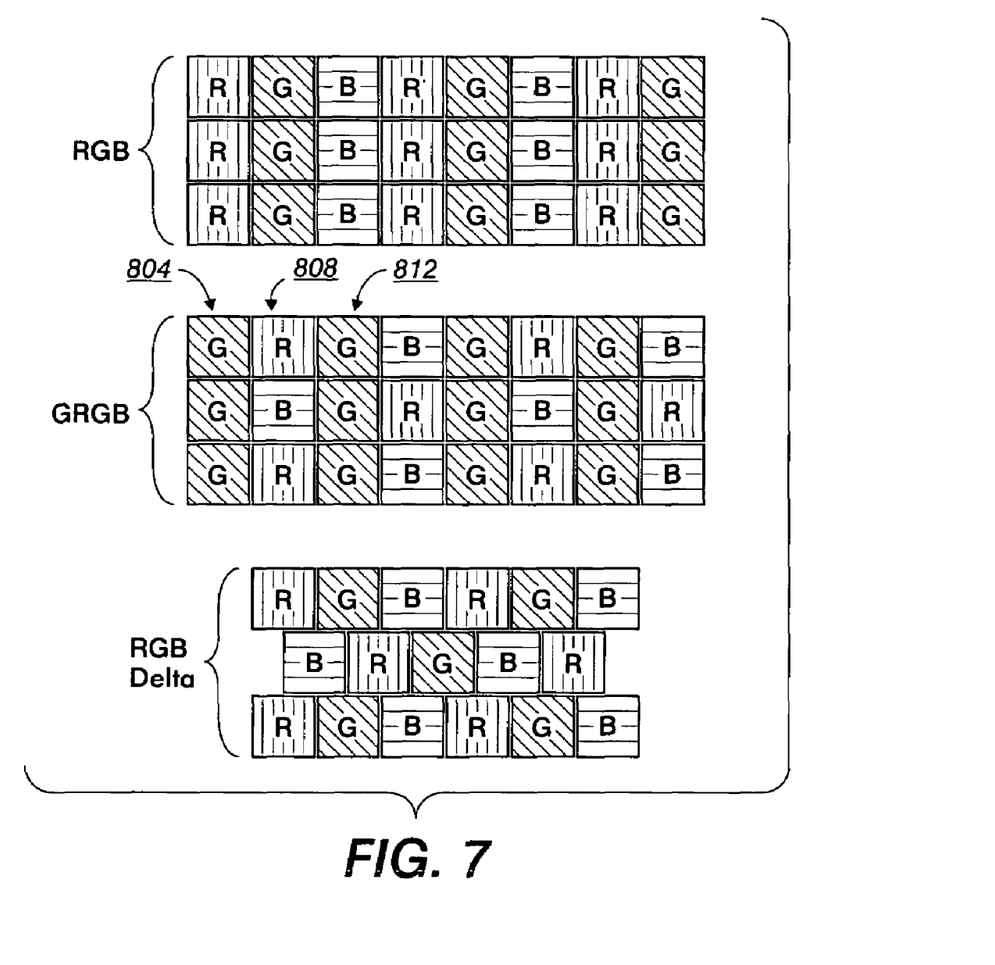
FIG. 7 provides an alternative color filter pattern layout

FIG. 6 and FIG. 7 show various color filter layouts. In FIG. 6, a pixel may be subdivided into red 704, green 708 and blue 712 subpixels to display a colour. Total output is controlled by additive mixing of colors. FIG. 7 shows a layout in which the colour filters 804, 808, 812 are arranged in various configurations.

Various techniques may be used to fabricate the described structures. In one embodiment, opaque data and gate lines are used as a photomask. The photomask is used to pattern wall structures using a positive photoresist and backside UV light exposure.

In the preceding description, various methods and systems for implementing a rear viewable display have been provided. The description includes numerous details, including display composition, parameters and various embodiments. The provided details are meant to provide examples and facilitate understanding. The details should not be used to limit the invention. Instead, the invention should only be limited by the claims, as originally presented and as they may be amended to encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A display including:
   an electronic backplane including a substantially transparent electrode, the electronic backplane includes large regions that are substantially transparent;
   an elastomeric counter electrode layer made of an electrically conductive material; and,
   a display media including a display material that changes reflective states in response to an applied electric field, the display material positioned between the substantially transparent electrode in the backplane and the counter electrode, the display designed such that light is reflected from the display media through the electronic backplane to an observer.

2. The display of claim 1 wherein the counter electrode is opaque.

3. The display of claim 1 wherein the counter electrode is substantially transparent.

4. The display of claim 1 wherein the display material is an electrophoretic ink.

5. The display of claim 4 wherein flexibility of the counter electrode and transparent electronic backplane enable flexing of the display into both concave and convex shapes.

6. The display of claim 1 wherein the display material in the display media is encapsulated.

7. The display of claim 1 wherein the display material relies on electro osmosis processes.

8. The display of claim 1 wherein chambers are directly formed onto the backplane and filled with the electrophoretic ink.

9. The display of claim 1 wherein the backplane includes an array of pixel switches to enable active matrix addressing of pixels in the display.

10. The display of claim 1 wherein the counter electrode is at least semi-transparent.

11. The display of claim 1 wherein the backplane includes an array of stripe electrodes to enable passive matrix addressing of pixels in the display.

12. The display of claim 1 wherein the ratio of transparent areas in the backplane to opaque areas in the backplane exceeds 70%.

13. The display of claim 1 wherein electronics are formed on a flexible transparent glass to form the backplane.

14. The display of claim 1 wherein electronics are formed on a polyester foil to form the backplane.

15. The display of claim 1 further comprising:
a plurality of color filters, each color filter deposited over a corresponding pixel in the backplane.

16. The display of claim 1 wherein the Young's modulus of the elastomer forming the counter electrode is between 0.01 and 0.1 Giga-Pascals.

17. A method of viewing a display image comprising of:
applying a voltage potential to electronic elements such that an electric field is created between electrodes in a backplane and an elastomeric counter electrode, the electric field to cause electrophoretic ink in the display to form a desired pattern;
transmitting light through the backplane to the electrophoretic ink;
reflecting light from the electrophoretic ink back through the backplane to an observer.

18. The method of claim 17 wherein a second voltage potential is applied to an opaque conducting elastomer that forms the counter electrode to the electrodes in the backplane.

19. The method of claim 17 wherein the electronic elements are pixels in an active matrix backplane.

20. The method of claim 17 wherein the electronic elements are segmented electrodes in a direct address display.

* * * * *